United States Patent
Chang

(10) Patent No.: US 9,607,459 B2
(45) Date of Patent: Mar. 28, 2017

(54) WIRELESSLY CHARGING ELECTRONIC LOCK DEVICE

(71) Applicant: HON HAI PRECISION INDUSTRY CO., LTD., New Taipei (TW)

(72) Inventor: Jen-Tsorng Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/860,734

(22) Filed: Sep. 22, 2015

(65) Prior Publication Data

US 2016/0350989 A1 Dec. 1, 2016

(30) Foreign Application Priority Data

May 25, 2015 (CN) .......................... 2015 1 0269662

(51) Int. Cl.
| | |
|---|---|
| G08B 21/00 | (2006.01) |
| G08B 29/00 | (2006.01) |
| G06Q 10/00 | (2012.01) |
| H02J 7/02 | (2016.01) |
| G07C 9/00 | (2006.01) |
| E05B 47/00 | (2006.01) |

(52) U.S. Cl.
CPC .......... G07C 9/00174 (2013.01); E05B 47/00 (2013.01); G07C 9/00007 (2013.01); H02J 7/025 (2013.01); E05B 2047/0048 (2013.01); E05B 2047/0072 (2013.01); E05B 2047/0082 (2013.01); E05B 2047/0084 (2013.01); G07C 2009/00611 (2013.01); G07C 2009/00769 (2013.01)

(58) Field of Classification Search
CPC ......... G08B 21/00; G08B 29/00; G06Q 10/00
USPC ..... 340/540, 5.61, 5.28; 705/1.1, 1, 400, 26, 705/35; 320/108
See application file for complete search history.

(56) References Cited

U.S. PATENT DOCUMENTS

| | | | | |
|---|---|---|---|---|
| 7,761,307 | B2 * | 7/2010 | Ochi ...................... | G06Q 40/00 705/1.1 |
| 8,188,854 | B2 * | 5/2012 | Yamashita .............. | H02J 7/025 320/108 |
| 8,854,224 | B2 * | 10/2014 | Kirby ...................... | H02J 7/025 340/636.1 |
| 2010/0274570 | A1 * | 10/2010 | Proefke ............... | B60L 11/1824 705/1.1 |
| 2013/0038447 | A1 * | 2/2013 | Peng .................. | G07C 9/00309 340/540 |
| 2015/0189683 | A1 * | 7/2015 | Bynum ................. | G06F 1/1632 455/557 |

* cited by examiner

Primary Examiner — Nam V Nguyen
(74) Attorney, Agent, or Firm — Zhigang Ma

(57) ABSTRACT

A wirelessly charging electronic lock device includes an electronic key and a electronic lock, a key code and a pre-stored matching code are pre-stored in the electronic key, an electronic lock code is pre-stored in the electronic lock, the electronic key includes a wireless charging device and a first wireless signal device, the wireless charging device charges the electronic device by wireless transmission, the electronic lock includes a wireless charging receiving device, a second wireless signal device, and a processing unit, the processing unit is configured to figure out a current matching code, the current matching code is compared with the pre-stored matching code, which is validated as to whether the electronic key matches with the electronic lock.

10 Claims, 1 Drawing Sheet

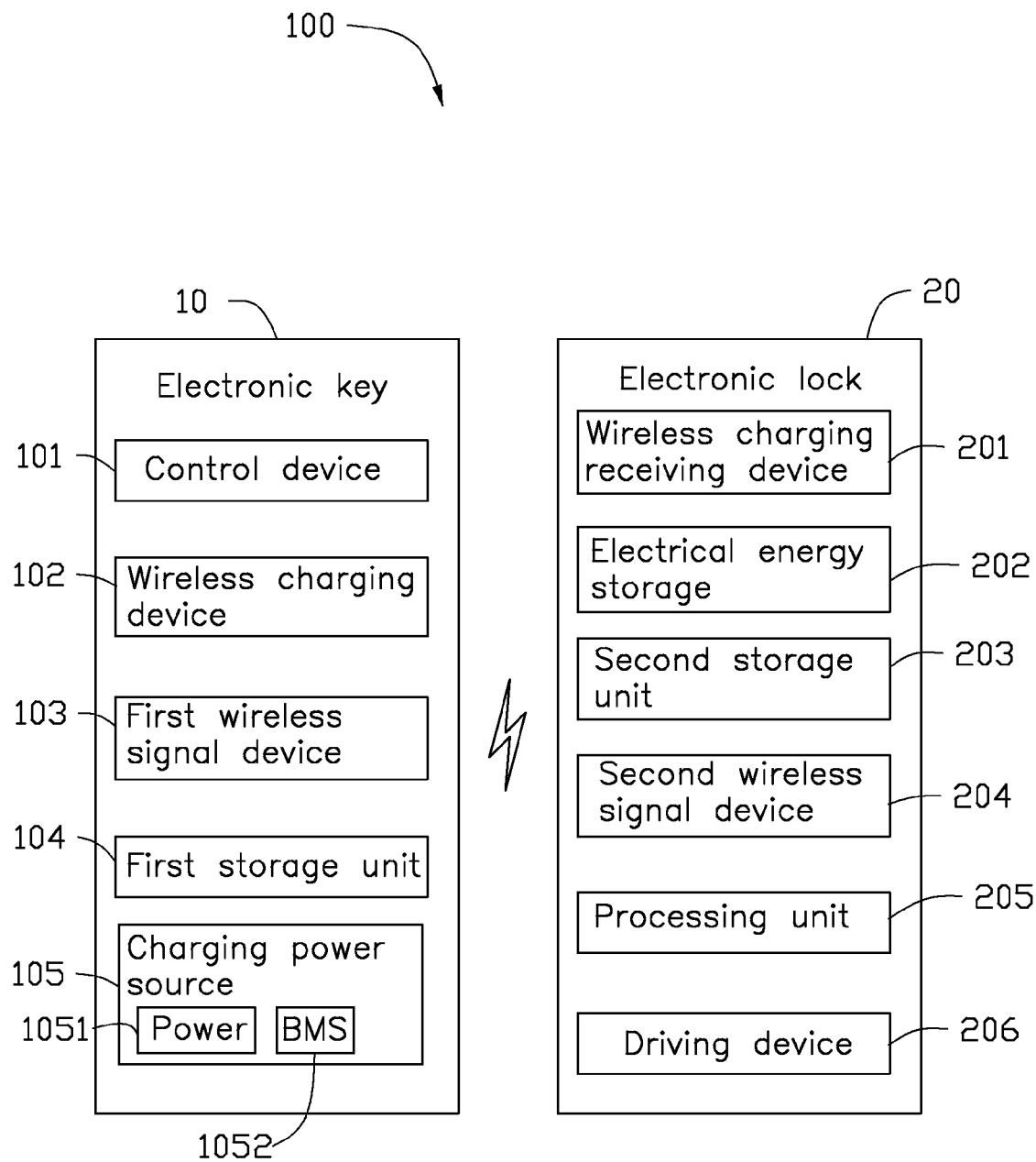

WIRELESSLY CHARGING ELECTRONIC LOCK DEVICE

FIELD

The subject matter herein generally relates to public security, especially relates to a wirelessly charging electronic lock.

BACKGROUND

There is a trend that electronic locks will replace the traditional mechanical locks. However, present electronics need a power source, which is not easy to carry, and long power charge time leads to shorten the life of the electronic lock.

BRIEF DESCRIPTION OF THE DRAWINGS

Implementations of the present technology will now be described, by way of example only, with reference to the attached figures, wherein:

The FIGURE is a device schematic view of a wirelessly charging electronic lock device of the present disclosure.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like. The references "a plurality of" and "a number of" mean "at least two."

The present disclosure is described in relation to a wirelessly charging electronic lock device. The device includes an electronic key and a electronic lock, a key code and a matching code are pre-stored in the electronic key. An electronic lock code is pre-stored in the electronic lock. The electronic key includes a wireless charging device and a first wireless signal device. The wireless charging device charges the electronic device by wireless transmission. The first wireless signal device is configured to send the key code and the pre-stored matching code, and receive the electronic lock code. The electronic lock includes a wireless charging receiving device, a second wireless signal device, and a processing unit. The wireless charging receiving device is configured to charge the electronic lock matching with the wireless charging device, the second wireless signal device is configured to receive the key code and the pre-stored matching code, and send the electronic lock code. The processing unit is configured to determine a current matching code, the current matching code is compared with the pre-stored matching code, which is validated as to whether the electronic key matches with the electronic lock. If matching, the electronic lock is unlocked. If not matching the electronic lock remains locked.

The FIGURE illustrates a wirelessly charging electronic lock device 100 includes an electronic key 10 and an electronic lock 20. The electronic key 10 is wirelessly connected with the electronic lock 20.

In at least one embodiment, the electronic key 10 is a handheld mobile device. The electronic key 10 includes a control device 101, a wireless charging device 102, a first wireless signal device 103, a first storage unit 104, a charging power source device 105, and a control button (not shown).

In general, the wireless charging device 102 is configured to charge the electronic lock 20 by wireless transmission after receiving run instructions from the control device 101. The wireless charging device 102 charges the electronic lock 20, to supply energy when the electronic lock 20 is opened, after the electronic key 10 is matched with the electronic lock 20. If the energy of the electronic lock 20 is enough, the wireless charging device 102 does not recharge the electronic lock 20. The wireless charging device 102 stops charging the electronic lock 20 after receiving a stop running instruction from the control device 101.

The first wireless signal device 103 is configured to send and receive matching codes between the electronic key 10 and the electronic lock 20.

In at least one embodiment, the first wireless signal device 103 is configured to send a key code Code I of the electronic key 10, a pre-stored matching code Code III and receive an electronic lock code Code II which is sent by an electronic lock 20 during a matching validation procedure. In at least one embodiment, the pre-stored matching codes follow Code III=Code I XOR Code II1+Code I AND Code II1, wherein, the key code Code I is the identification number of the electronic key 10, a pre-stored electronic lock code Code II1 is the identification number of the electronic lock 20 which is matched with the electronic key 10. In another embodiment, the pre-stored matching code Code III can be formulated by design.

The first storage unit 104 is configured to store the key code Code I and the pre-stored matching code Code III.

The charging power source device 105 is configured to power the control device 101, the wireless charging device 102, the first wireless signal device 103, and the first storage unit 104, and charge the electronic lock 20 using the wireless charging device 102 by wireless transmission.

Further, a electronic switch (not shown) is arranged between the charging power source device 105 and the control device 101, the wireless charging device 102, the first wireless signal device 103 and the storage unit 104. When the control button of the electronic key 10 is pressed, all of the electronic switches are closed; the electronic key 10 is in a working state. When the electronic lock is unlocked, the control button is pressed again, all of the electronic switches are closed, the electronic key 10 stays in a in a dormant state.

The charging power source device 105 includes a power source 1051 and a power management system 1052.

In at least one embodiment, the power source is a lithium battery. In another embodiment, the power source 1051 can be solar battery or other mini battery.

The power management system 1052 is configured to improve the utilization of the battery, prevent battery overcharging and excessive discharging, prolong the service life of the battery, and monitor the status of the battery.

The electronic lock 20 includes a wireless charging receiving device 201, an electrical energy storage 202, a second storage device 203, a second wireless signal device 204, a processing unit 205 and a driving device 206.

The wireless charging receiving device 201 is configured to receive wireless charging electrical energy of the wireless charging device 102, and store the energy in the electrical energy storage 202.

The electrical energy storage 202 is configured to store the electrical energy that is received by the wireless charging receiving device 201, and supply the energy to the second wireless signal device 204, the second storage device 203, the processing unit 205, and the driving device 206. In at least one embodiment, the electrical energy storage 202 is a super capacitor.

The second storage device 203 is configured to store the key code Code I and the pre-stored matching code Code III that are received by the second wireless signal device 204. The second storage device 203 also stores the electronic lock code Code II of the electronic lock 20.

The second wireless signal device 204 is configured to receive the key code Code I and the pre-stored matching code Code III, and store the key code Code I and the pre-stored code matching Code III in the second storage device 203 after receiving the key code Code I and the pre-stored matching code Code III, and extract the electronic lock code Code II from the second storage device 203 after receiving the key code Code I, then send the electronic lock code Code II to the first wireless signal device 103.

The processing unit 205 is configured to figure out a Code III1 using the key code Code I which is received by the second wireless signal device 204 and the electronic lock code Code II which is pre-stored in the second storage device 203, and compared to the pre-stored matching code Code III to validate whether the electronic key 10 is matched with the electronic lock 20. If the Code III1 is the same as the Code III, i.e., the electronic key 10 is matched with the electronic lock 20. A recharging signal is sent to the wireless charging device 102, and a driving signal is sent to the driving device 206. If the Code III1 is not the same as the Code III, i.e., the electronic key 10 is not matched with the electronic lock 20. A recharging signal and a driving signal are not sent to the wireless charging device 102 and the driving device 206.

In at least one embodiment, the code Code III1=Code I XOR Code II+Code I AND Code II. Wherein, a current matching code Code I is an identification number of the electronic key 10, an electronic lock code Code II is the identification number of the electronic lock 20. In another embodiment, the current matching code Code III1 can be formulated by design.

The driving device 206 drives the relevant portion of electronic lock 20 to unlock after receiving the driving signal which is sent by the processing unit 205, to open the electronic lock 20.

When the electronic key 10 is closed, and the control button of the electronic key is pressed, the control device 101 gives a run command to the device and unit of the internal of the electronic key 10, all of the switches are closed, the electronic key 10 is in a working state. The wireless charging device 102 is corresponding to the wireless charging receiving device 201, and charging the electronic lock 20, after the wireless charging device 102 receives the command code. Then, the first wireless signal device 103 extracts the key code Code I which is stored in the first storage unit 104, and sends the key code Code I to the second wireless signal device 204. The second wireless signal device 204 saves the key code Code I in the second storage device 203, extracts the electronic lock code Code II, and sends the electronic lock code Code II to the first wireless signal device 103 after receiving the key code Code I. The first wireless signal device 103 extracts the pre-stored matching code Code III, and sends the pre-stored matching code Code III to the second wireless signal device 204 after receiving the electronic lock code Code II. The second wireless signal device 204 stores the pre-stored matching code Code III in the second storage unit 203, and sends the first processing signal to the processing unit 205 after receiving the pre-stored matching code Code III. The processing unit 205 determines the current matching code Code III1 according to the key code Code I which is stored in the second storage unit 203 and the electronic lock code Code II, and compares the current matching code Code III1 to the pre-stored matching code Code III stored in the storage device 203 after the processing unit 205 receives the first processing signal. If the current matching code Code III1 is the same as the pre-stored matching code Code III, the continuing charging signal is sent to the wireless charging device 102, and the wireless charging device 102 continues to charge the electronic lock after receiving the continue charging signal. At the same time, a driving signal is sent to the first driving device 206, the first driving device 206 drives the electronic lock 20 to unlock after receiving the driving signal. If the current matching code Code III1 is not the same as the pre-stored matching code Code III, the continuing charging signal is not sent to the wireless charging device 102, and a driving signal is not sent to the first driving device 206, the electronic lock 20 does not lock. When the electronic lock 20 is unlocked and the control button of the electronic key 10 is pressed again, after the electronic lock 20 is unlocked, all of the electronic switches are closed, the electronic key 10 stays in a dormant state.

The electronic lock of the present disclosure uses electronic signal wireless transmission function and decoding method to charge, open or close the corresponding electronic lock, thus electronic lock has a longer lifespan; because the complexity of the algorithm can be designed, and the electronic lock has no corresponding key hole, the electronic device is not easily picked; and due to the electronic lock has no power itself, it is very simple and light, and the opening or the closing of the electronic lock is not influenced (power supply is in the electronic key), because of the insufficient of the battery power.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A wirelessly charging electronic lock device, comprising:
an electronic key comprising a wireless charging device and a first wireless signal device; and an electronic lock comprising a wireless charging receiving device, a second wireless signal device, and a processing unit;
wherein a key code and a pre-stored matching code are pre-stored in the electronic key, an electronic lock code is pre-stored in the electronic lock, the first wireless signal device is configured to send the key code and the pre-stored matching code and receive the electronic lock code;

wherein the wireless charging device charges the electronic lock through the wireless charging receiving device by wireless transmission, the second wireless signal device is configured to receive the key code and the pre-stored matching code and send the electronic lock code;

wherein the processing unit is configured to calculate a current matching code according to a calculation formula, the current matching code is compared with the pre-stored matching code, which is validated as to whether the electronic key matches with the electronic lock, and if matching, the electronic lock is unlocked, and if not matching, the electronic lock remains locked; and wherein the calculation formula of the current matching code is Code III1=Code I XOR Code II+Code I AND Code II, wherein Code III1 is the current matching code, Code I is the key code, and Code II is the electronic lock code.

2. The device of claim 1, wherein the electronic key comprises a control device, the control device is configured to received a user's instruction, and send start and stop instructions to control the starting and stopping of the electronic key.

3. The device of claim 1, wherein the electronic key comprises a first storage unit, the first storage unit is configured to store the key code and the pre-stored matching code.

4. The device of claim 1, wherein the electronic key comprises a power source charging device, the power source charging device is configured to supply power to the electronic key.

5. The device of claim 4, wherein the power source charging device comprises a power source and a power management system, the power management system is configured to improve a utilization of the power source, prevent overcharging and excessive discharge, prolong a service life of the power source, and monitor a status of the power source.

6. The device of claim 1, wherein the electronic lock comprises an electrical energy storage, the electrical energy storage is configured to store an electrical energy that is received by the wireless charging receiving device, and supply the electrical energy to the electronic lock.

7. The device of claim 1, wherein the electronic lock comprises a second storage unit, the second storage unit is configured to store the key code and pre-stored matching code received by the second wireless signal device.

8. The device of claim 1, wherein the electronic lock comprises a driving device, the driving device drives the electronic lock unlock after receiving a driving signal which is sent by the processing unit, and then open the electronic lock.

9. The device of claim 1, wherein a calculation formula of the pre-stored matching code is the same as that of the current matching code.

10. The device of claim 9, wherein the calculation formula of the pre-stored code is Code III=Code I XOR Code II1+Code I AND Code II1, Code III is the pre-stored matching code, Code I is the key code, Code II1 is a pre-stored electronic lock code of an electronic lock which is matched with the electronic key.

* * * * *